US 11,076,411 B2

United States Patent
Zhu et al.

(10) Patent No.: US 11,076,411 B2
(45) Date of Patent: Jul. 27, 2021

(54) METHOD FOR SELECTING MANAGEMENT FRAME ANTENNA BASED ON MASTER-SLAVE NETWORK AND APPARATUS

(71) Applicant: HUAWEI TECHNOLOGIES CO., LTD., Guangdong (CN)

(72) Inventors: Chong Zhu, Wuhan (CN); Yanju Li, Wuhan (CN); Guiqiang Lv, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/066,884

(22) PCT Filed: Dec. 31, 2015

(86) PCT No.: PCT/CN2015/100295
§ 371 (c)(1),
(2) Date: Jun. 28, 2018

(87) PCT Pub. No.: WO2017/113378
PCT Pub. Date: Jul. 6, 2017

(65) Prior Publication Data
US 2019/0014586 A1 Jan. 10, 2019

(51) Int. Cl.
*H04W 72/08* (2009.01)
*H04W 88/08* (2009.01)
(Continued)

(52) U.S. Cl.
CPC ........ *H04W 72/085* (2013.01); *H04B 7/0602* (2013.01); *H04B 7/0691* (2013.01);
(Continued)

(58) Field of Classification Search
CPC ........... H04W 72/085; H04W 72/0446; H04W 72/048; H04W 72/082; H04W 72/046; H04W 88/08; H04B 7/0602; H04B 7/0691
See application file for complete search history.

(56) References Cited

U.S. PATENT DOCUMENTS

2007/0071149 A1* 3/2007 Li .................... H04B 7/0805
375/347
2007/0093270 A1 4/2007 Lagnado
(Continued)

FOREIGN PATENT DOCUMENTS

CN 1956346 A 5/2007
CN 101034925 A 9/2007
(Continued)

OTHER PUBLICATIONS

Ahmed O. D. Ali et al. Distributed Antenna Selection Algorithms for Improving BER in MIMO Interference Channels, 2014 IEEE 25th Annual International Symposium on Personal, Indoor, and Mobile Radio Communication (PIMRC), Sep. 2014. pp. 402-406.
(Continued)

*Primary Examiner* — Walter J Divito
*Assistant Examiner* — Anthony Luo
(74) *Attorney, Agent, or Firm* — Fish & Richardson P.C.

(57) ABSTRACT

A method for selecting a management frame antenna based on a master-slave network and an apparatus are provided. In one example method, when a preset condition is met, a signal quality collection instruction is sent by a master device to a first slave device and a second slave device, so as to receive returned signal quality information. A management frame antenna is selected for the first slave device and a management frame antenna for the second slave device according to the received signal quality information, so that the selected management frame antennas can implement
(Continued)

signal coverage optimization in an entire area managed by the master device.

19 Claims, 4 Drawing Sheets

(51) Int. Cl.
*H04B 7/06* (2006.01)
*H04W 72/04* (2009.01)

(52) U.S. Cl.
CPC ..... *H04W 72/048* (2013.01); *H04W 72/0446* (2013.01); *H04W 72/082* (2013.01); *H04W 88/08* (2013.01); *H04W 72/046* (2013.01)

(56) References Cited

U.S. PATENT DOCUMENTS

| | | | | |
|---|---|---|---|---|
| 2008/0194267 | A1* | 8/2008 | Ahn | H04B 7/2606 455/450 |
| 2008/0232325 | A1 | 9/2008 | Mehta et al. | |
| 2011/0021163 | A1 | 1/2011 | Lindgren et al. | |
| 2011/0273977 | A1* | 11/2011 | Shapira | H04B 7/0452 370/208 |
| 2012/0207048 | A1* | 8/2012 | Kim | H04W 72/082 370/252 |
| 2014/0010156 | A1 | 1/2014 | Chuang et al. | |
| 2015/0351086 | A1 | 12/2015 | Banu et al. | |
| 2015/0381246 | A1 | 12/2015 | Huang et al. | |
| 2016/0255605 | A1 | 9/2016 | Kyeong et al. | |
| 2016/0360421 | A1 | 12/2016 | Guo | |

FOREIGN PATENT DOCUMENTS

| | | |
|---|---|---|
| CN | 101730979 A | 6/2010 |
| CN | 101981826 A | 2/2011 |
| CN | 102647723 A | 8/2012 |
| CN | 103733527 A | 4/2014 |
| CN | 103905104 A | 7/2014 |
| CN | 103945409 A | 7/2014 |
| CN | 104812038 A | 7/2015 |
| EP | 2375499 A1 | 10/2011 |
| WO | 2015064832 A1 | 5/2015 |

OTHER PUBLICATIONS

Extended European Search Report issued in European Application 15912002.1 dated Nov. 26, 2018, 9 pages.
International Search Report and Written Opinion issued in International Application No. PCT/CN2015/100295 dated Sep. 22, 2016, 9 pages.
Office Action issued in Chinese Application No. 201580079558.6 dated Nov. 28, 2019, 15 pages (with English translation).

\* cited by examiner

METHOD FOR SELECTING MANAGEMENT FRAME ANTENNA BASED ON MASTER-SLAVE NETWORK AND APPARATUS

CROSS-REFERENCE TO RELATED APPLICATIONS

This application is a National Stage of International Application No. PCT/CN2015/100295, filed on Dec. 31, 2015, which is hereby incorporated by reference in its entirety.

TECHNICAL FIELD

The present invention relates to the wireless communications technologies, and in particular, to a method for selecting a management frame antenna based on a master-slave network and an apparatus.

BACKGROUND

A master-slave network generally includes a master device (Master Device, MD for short), a slave device (Slave Device, SD for short), and a user device (User Device, UD for short). An MD is responsible for managing an SD in a management area, and when necessary, communicating and interacting with another MD based on a communications protocol between the MDs. The MD may also take over a service function of the SD, so as to provide an external service. The SD cooperates with the MD to execute the service function to provide the external service, and can provide a management signaling channel and a service forwarding channel for a lower-level SD. A UD can obtain a service by connecting to an autonomous network. Currently, an access point controller (Access Point Controller, AC for short)-based Wireless Fidelity (Wireless Fidelity, WI-FI for short) centralized management network is deployed in a form of such a master-slave network. An AC, acting as a master device, controls a remote access point (Access Point, AP for short) by using a management protocol. The AP, acting as a slave device, is similar to a remote antenna and provides a WI-FI Internet access service for a UD.

In the prior art, after multiple UDs access the AP, for example, a UD1 and a UD2 have accessed the AP, the AP adjusts a management frame antenna of the AP after detecting signal strengths of the UD1 and UD2, so as to ensure that the accessed UDs are under coverage.

However, in the prior art, the AP adjusts the management frame antenna according to the UDs that have accessed the AP currently, and optimization in an entire area managed by the MD cannot be ensured.

SUMMARY

Embodiments of the present invention provide a method for selecting a management frame antenna based on master-slave network and an apparatus, so as to resolve a prior-art problem that optimization in an entire area managed by an MD cannot be ensured.

A first aspect of the present invention provides a method for selecting a management frame antenna based on a master-slave network, where the master-slave network includes: a master device, a first slave device, a second slave device, and a first user device, and the first user device is connected to the first slave device; and the method includes: when a second user device accesses the master-slave wireless network or signal quality between the first user device and the first slave device meets a preset condition, sending, by the master device, a signal quality collection instruction to the first slave device and the second slave device, where the signal quality collection instruction is used to instruct the first slave device to separately monitor signal quality between the first slave device and the first user device and signal quality between the first slave device and the second user device by using each antenna group of the first slave device, and instruct the second slave device to separately monitor signal quality between the second slave device and the first user device and signal quality between the second slave device and the second user device by using each antenna group of the second slave device;

receiving, by the master device, signal quality information returned by the first slave device and signal quality information returned by the second slave device; and selecting, by the master device according to the received signal quality information, an antenna group as a management frame antenna for the first slave device and an antenna group as a management frame antenna for the second slave device.

In the method for selecting a management frame antenna based on a master-slave network according to this embodiment of the present invention, when the second UD accesses the master-slave network or the signal quality between the first UD and the first SD meets the preset condition, the MD sends the signal quality collection instruction to the first SD and the second SD, to instruct the first SD to separately monitor the signal quality between the first SD and the first UD and the signal quality between the first SD and the second UD by using each antenna group of the first SD, and to instruct the second SD to separately monitor the signal quality between the second SD and the first UD and the signal quality between the second SD and the second UD by using each antenna group of the second SD; and then selects, according to the received signal quality information, an antenna group as the management frame antenna for the first slave device and an antenna group as the management frame antenna for the second slave device. In this way, the master device can determine a signal strength of an entire management area according to signal quality monitored by each antenna group of a slave device, so that the selected management frame antennas can implement signal coverage optimization in the entire area managed by the master device.

With reference to the first aspect, in a first implementation of the first aspect, the selecting, by the master device according to the received signal quality data, an antenna group for the first slave device and an antenna group for the second slave device includes:

adding up signal quality between the first slave device and the first user device and signal quality between the first slave device and the second user device that are monitored by a same antenna group of the first slave device, to obtain a sum of the signal quality monitored by the antenna group of the first slave device, and adding up signal quality between the second slave device and the first user device and signal quality between the second slave device and the second user device that are monitored by a same antenna group of the second slave device, to obtain a sum of the signal quality monitored by the antenna group of the second slave device;

obtaining multiple signal quality accumulated values by separately adding up each of sums of the signal quality monitored by all antenna groups of the first slave device and each of sums of the signal quality monitored by all antenna groups of the second slave device; and determining an antenna group of the first slave device and an antenna group of the second slave device that are corresponding to a maximum signal quality accumulated value of the multiple signal quality accumulated values as the management frame antenna of the first slave device and the management frame antenna of the second slave device, respectively.

In this implementation, the multiple signal quality accumulated values are obtained by separately adding up each of the sums of the signal quality monitored by all antenna groups of the first slave device and each of the sums of the signal quality monitored by all antenna groups of the second slave device; and the antenna group of the first slave device and the antenna group of the second slave device that are corresponding to the maximum signal quality accumulated value of the multiple signal quality accumulated values are determined as the management frame antenna of the first slave device and the management frame antenna of the second slave device, respectively. This can optimize signal coverage in the entire area managed by the master device.

With reference to the first aspect or the foregoing implementation, in a second implementation of the first aspect, the determining an antenna group of the first slave device and an antenna group of the second slave device that are corresponding to a maximum signal quality accumulated value of the multiple signal quality accumulated values as the management frame antenna of the first slave device and the management frame antenna of the second slave device, respectively includes:

if there are multiple maximum signal quality accumulated values, determining antenna groups of the first slave device and antenna groups of the second slave device that are corresponding to the maximum signal quality accumulated values of the multiple signal quality accumulated values; and selecting, from the determined antenna groups of the first slave device and the determined antenna groups of the second slave device, antenna groups that are corresponding to a maximum signal quality accumulated value among antenna groups connected to the first user device or the second user device, as the management frame antenna of the first slave device and the management frame antenna of the second slave device.

With reference to any one of the first aspect or the foregoing implementations, in a third implementation of the first aspect, the signal quality information includes one or a combination of the following: a signal strength, a signal-to-noise ratio, or a distance between an antenna group and a monitored user device.

A second aspect of the present invention provides a master device, where the master device is configured to implement functions of the method according to the first aspect in a form of hardware/software, and the hardware/software includes units that are corresponding to the functions.

A third aspect of the present invention provides a master device, where the master device is applied to a master-slave network, the master-slave network includes: the master device, a first slave device, a second slave device, and a first user device; the first user device is connected to the first slave device; and the master device includes: a processor, an interface circuit, a memory, and a bus, where the processor, the interface circuit, and the memory are connected and communicate with each other by using the bus, the memory stores a set of program code, and the processor invokes the program code stored in the memory to implement the steps of the method according to the first aspect.

A fourth aspect of the present invention provides a computer storage medium, configured to store a computer software instruction to be used by the foregoing master device, where the computer software instruction includes a program used to execute the foregoing aspects.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
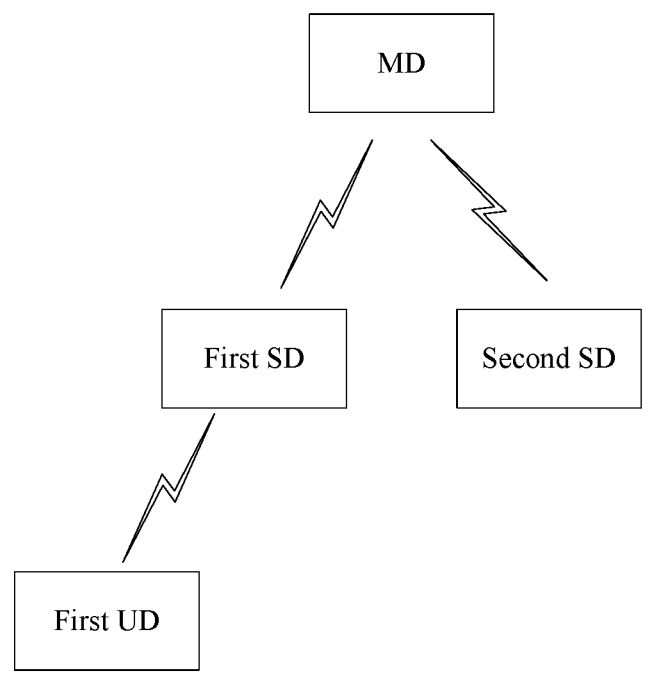
FIG. 1 is a schematic diagram of an application scenario of a method for selecting a management frame antenna based on a master-slave network according to the present invention.

FIG. 1 is a schematic diagram of an application scenario of a method for selecting a management frame antenna based on a master-slave network according to the present invention. The method may be applicable to a master-slave network. The master-slave network includes: an MD, at least one SD in an MD management area, and at least one UD that accesses the SD. In specific implementation, the MD may also communicate with another master device based on a communication protocol between MDs.

FIG. 1 is used as an example. The master-slave network shown in FIG. 1 includes: an MD, a first SD, a second SD, and a first UD. The first UD is connected to the first SD, that is, the first UD accesses the first SD.

In this embodiment, the MD may be an AC, the SD may be an AP, and the UD may be a device that may access the AP by using a network, such as a mobile phone, a tablet computer, or a notebook computer, but no limitation is set thereto.

It should be noted that the SD herein may be an SD that supports a smart antenna, or may be an SD that does not support a smart antenna. The smart antenna is specifically an antenna that can adaptively adjust an antenna combination manner, that is, an adaptively adjusted antenna array. For example, an SD that supports a smart antenna has eight antennas, and arrays of the eight antennas can be adaptively adjusted according to a specific status.

Figure 2:
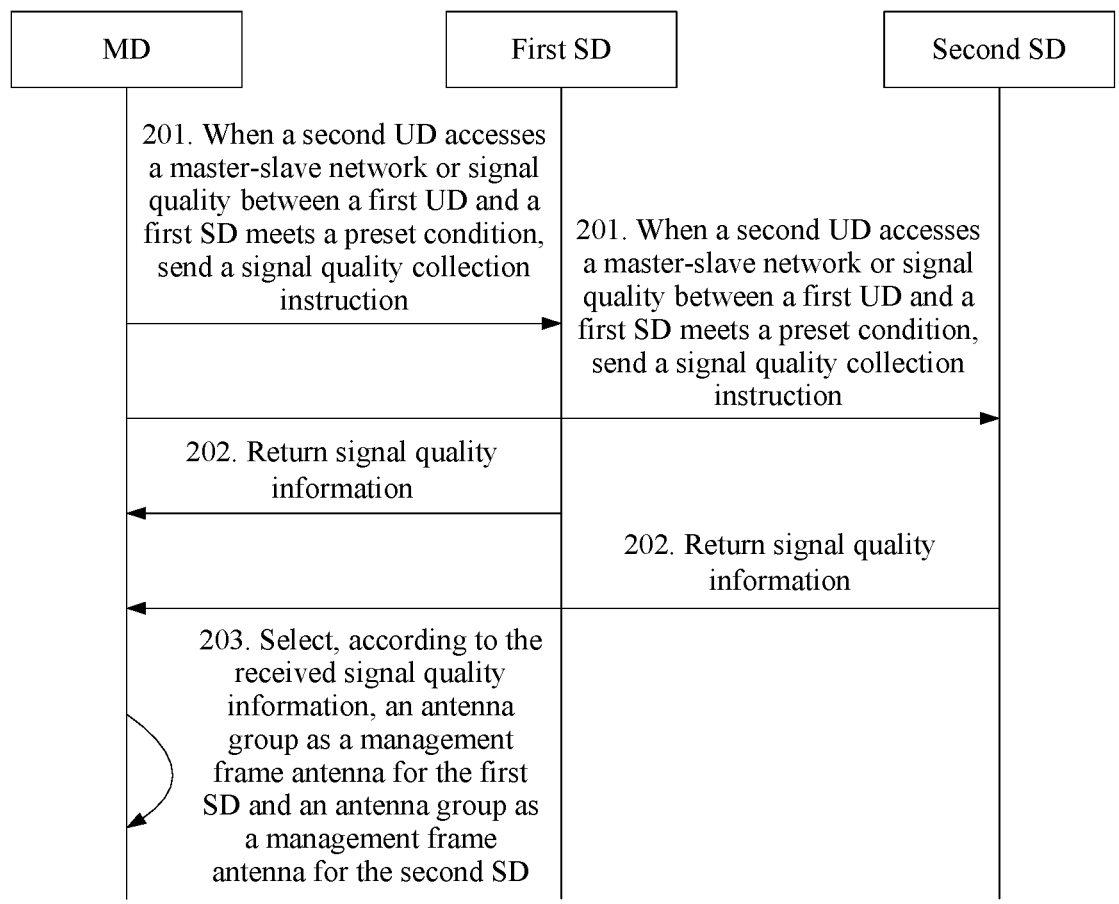
FIG. 2 is a schematic flowchart of Embodiment 1 of a method for selecting a management frame antenna based on a master-slave network according to the present invention.

FIG. 2 is a schematic flowchart of Embodiment 1 of a method for selecting a management frame antenna based on a master-slave network according to the present invention. The method is applicable to the foregoing master-slave network. As shown in FIG. 2, the method includes the following steps.

S201. When a second UD accesses a master-slave network or signal quality between a first UD and a first SD meets a preset condition, the MD sends a signal quality collection instruction to the first SD and a second SD. The first UD is a UD that has accessed the first SD, and the second UD is a UD that newly accesses the master-slave network.

The signal quality collection instruction is used to instruct the first SD to separately monitor signal quality between the first SD and the first UD and signal quality between the first SD and the second UD by using each antenna group of the first SD, and instruct the second SD to separately monitor signal quality between the second SD and the first UD and signal quality between the second SD and the second UD by using each antenna group of the second SD, that is, instruct each antenna group of each SD to monitor signal quality between each SD and a UD that accesses the master-slave network. The signal quality collection instruction may include an identity of the first UD and an identity of the second UD. In specific implementation, the identity of the first UD and the identity of the second UD may be a MAC address of the first UD and a MAC address of the second UD, respectively.

That is, when the second UD accesses the master-slave network or the signal quality between the first UD and the first SD meets the preset condition, management frame antenna selection is triggered. Specifically, the MD may proactively send the signal quality collection instruction when the MD itself detects that the second UD accesses the master-slave network or when the signal quality between the first UD and the first SD meets the preset condition. Alternatively, when the first SD or the second SD detects that the second UD accesses the master-slave network, or the signal quality between the first UD and the first SD meets the preset condition, the first SD or the second SD may send a management frame antenna selection request to the MD, and the MD sends the signal quality collection instruction after receiving the management frame antenna selection request.

Specifically, that the signal quality between the first UD and the first SD meets the preset condition may be: the signal quality between the first UD and the first SD meets a preset threshold, to indicate that the signal quality between the first UD and the first SD deteriorates. Generally, the signal quality may deteriorate to some extent, or dramatically deteriorate in a short time. For example, an RSSI indicates that the signal quality changes from strong to weak in a short time.

Each antenna group may include at least two antennas. Configuration of the antenna group is generally preset in the SD. For example, the configuration of the antenna group may be in a 2×2 form, that is, two antenna groups are included, each including two antennas; or may be in a 4×4 form, that is, four antenna groups are included, each including four antennas, but no limitation is set thereto.

S202. The master device receives signal quality information returned by the first slave device and signal quality information returned by the second slave device.

The signal quality information may include an identity of an antenna group, an identity of a monitored UD, and corresponding signal quality. For example, first UD signal quality information that is monitored by an antenna group of the first SD and that is returned by the first SD may include an identity of the antenna group, the identity of the first UD, and the signal quality between the first UD and the first SD monitored by the antenna group. The signal quality information may be specifically represented as {an antenna group ID, a monitored UD identity, and signal quality}, but this is not limited.

S203. The master device selects, according to the received signal quality information, an antenna group as a management frame antenna for the first SD and an antenna group as a management frame antenna for the second SD.

In this embodiment, when the second UD accesses the master-slave network or the signal quality between the first UD and the first SD meets the preset condition, the MD sends the signal quality collection instruction to the first SD and the second SD, to instruct the first SD to separately monitor signal quality between the first SD and the first UD and signal quality between the first SD and the second UD by using each antenna group of the first SD, and to instruct the second SD to separately monitor signal quality between the second SD and the first UD and signal quality between the second SD and the second UD by using each antenna group of the second SD; and then selects, according to the received signal quality information, an antenna group as the management frame antenna for the first SD and an antenna group as the management frame antenna for the second SD. In this way, the master device can determine a signal strength of an entire management area according to signal quality monitored by each antenna group of a slave device, so that the selected management frame antennas can implement signal coverage optimization in the entire area managed by the master device.

In specific implementation, the signal quality may include one or a combination of the following: a signal strength, a signal-to-noise ratio, a distance between an antenna group and a monitored UD, or the like, but no limitation is set thereto. The signal strength may be a received signal strength indicator (Received Signal Strength Indication, RSSI for short).

Figure 3:
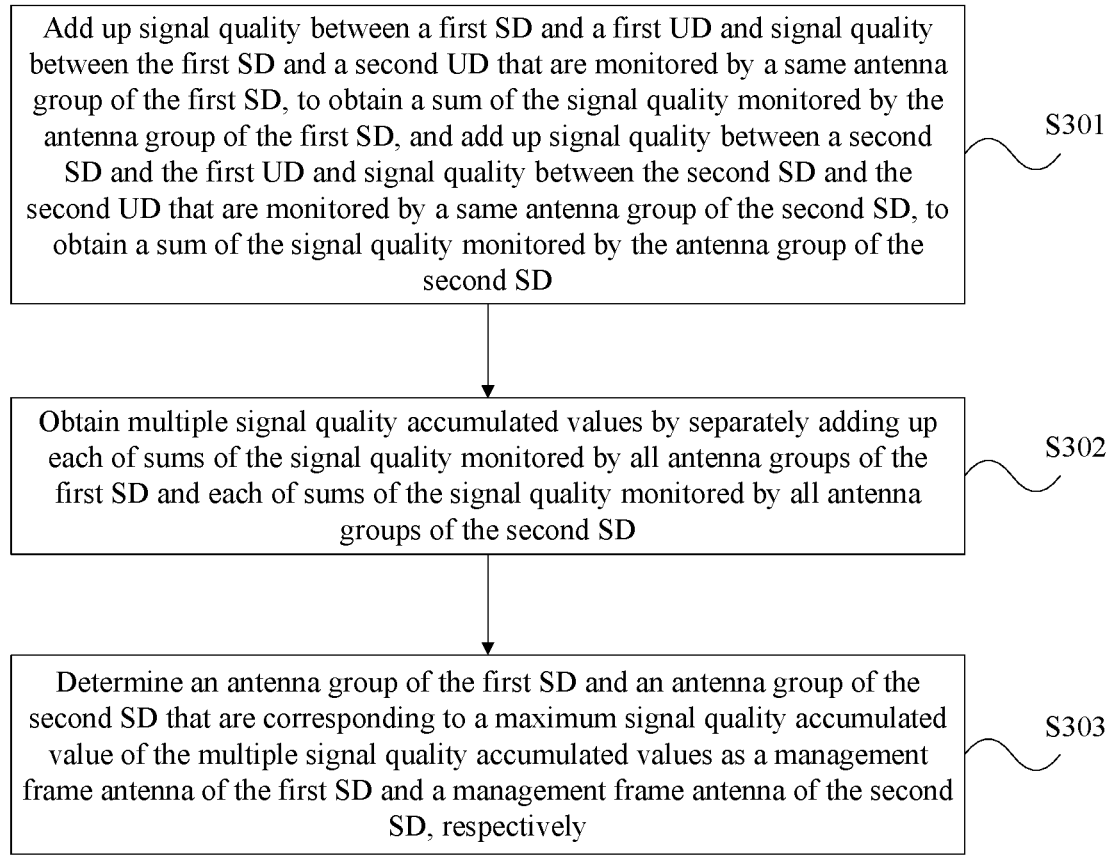
FIG. 3 is a schematic flowchart of Embodiment 2 of a method for selecting a management frame antenna based on a master-slave network according to the present invention.

FIG. 3 is a schematic flowchart of Embodiment 2 of a method for selecting a management frame antenna based on a master-slave network according to the present invention. As shown in FIG. 3, that the master device selects, according to the received signal quality information, an antenna group as a management frame antenna for the first SD and an antenna group as a management frame antenna for the second SD may include the following steps.

S301. Add up signal quality between the first SD and the first UD and signal quality between the first SD and the second UD that are monitored by a same antenna group of the first SD, to obtain a sum of the signal quality monitored by the antenna group of the first SD, and add up signal quality between the second SD and the first UD and signal quality between the second SD and the second UD that are monitored by a same antenna group of the second SD, to obtain a sum of the signal quality monitored by the antenna group of the second SD.

For example, the first SD and the second SD each include two antenna groups. The antenna groups of the first SD are denoted as an SD1-1 and an SD1-2. Monitored signal quality between the first SD and the first UD and monitored signal quality between the first SD and the second UD are denoted as SD1-1–UD1, SD1-1–UD2, SD1-2–UD1, and SD1-2–UD2. That is, a sum of the signal quality monitored by the SD1-1 antenna group of the first SD is SD1-1–UD1+SD1-1–UD2, and a sum of the signal quality monitored by the SD1-2 antenna group of the first SD is SD1-2–UD1+SD1-2–UD2. Other cases are similar and are not repeated herein. The antenna groups of the second SD are denoted as an SD2-1 and an SD2-2. Monitored signal quality between the second SD and the first UD and monitored signal quality between the second SD and the second UD are denoted as SD2-1–UD1, SD2-1–UD2, SD2-2–UD1, and SD2-2–UD2. That is, a sum of the signal quality monitored by the SD2-1 antenna group of the second SD is SD2-1–UD1+SD2-1–UD2, and a sum of the signal quality monitored by the SD1-2 antenna group of the second SD is SD2-2–UD1+SD2-2–UD2.

S302. Obtain multiple signal quality accumulated values by separately adding up each of sums of the signal quality monitored by all antenna groups of the first SD and each of sums of the signal quality monitored by all antenna groups of the second SD.

For example, a first signal quality accumulated value is obtained by adding up "the sum of the signal quality monitored by the SD1-1 antenna group" and "the sum of the signal quality monitored by the SD2-1 antenna group"; a second signal quality accumulated value is obtained by adding up "the sum of the signal quality monitored by the SD1-1 antenna group" and "the sum of the signal quality monitored by the SD2-2 antenna group"; a third signal quality accumulated value is obtained by adding up "the sum of the signal quality monitored by the SD1-2 antenna group" and "the sum of the signal quality monitored by the SD2-1 antenna group"; and a fourth signal quality accumulated value is obtained by adding up "the sum of the signal quality monitored by the SD1-2 antenna group" and "the sum of the signal quality monitored by the SD2-2 antenna group".

S303. Determine an antenna group of the first SD and an antenna group of the second SD that are corresponding to a maximum signal quality accumulated value of the multiple signal quality accumulated values as the management frame antenna of the first SD and the management frame antenna of the second SD, respectively.

For example, in the foregoing four signal quality accumulated values, the third signal quality accumulated value is the maximum signal quality accumulated value, and the antenna groups corresponding to the third signal quality accumulated value are the SD1-2 and the SD2-1. Therefore, the SD1-2 is used as the management frame antenna of the first SD, and the SD2-1 is used as the management frame antenna of the second SD.

Optionally, S303 may be: If there are multiple maximum signal quality accumulated values, determine antenna groups of the first SD and antenna groups of the second SD that are corresponding to the maximum signal quality accumulated values of the multiple signal quality accumulated values; and select, from the determined antenna groups of the first SD and the determined antenna groups of the second SD, antenna groups that are corresponding to the maximum signal quality accumulated value among antenna groups connected to the first UD or the second UD as the management frame antenna of the first SD and the management frame antenna of the second SD.

That is, in the foregoing embodiment, if there are multiple maximum signal quality accumulated values, for example, the third signal quality accumulated value and the first signal quality accumulated value are equal and are both the maximum signal quality accumulated values, further determination needs to be made. Specifically, first, the antenna groups corresponding to the third signal quality accumulated value and the antenna groups corresponding to the second signal quality accumulated value may be determined, separately. The antenna groups corresponding to the second signal quality accumulated value are the SD1-1 and the SD2-1, and the antenna groups corresponding to the third signal quality accumulated value are the SD1-2 and the SD2-1. It can be determined that the antenna groups corresponding to the second signal quality accumulated value and the third signal quality accumulated value include the SD1-1, the SD1-2, and the SD2-1. For the second SD, because both the antenna group corresponding to the second signal quality accumulated value and the antenna group corresponding to the third signal quality accumulated value are the SD2-1, the SD2-1 can be directly determined as the management frame antenna of the second SD. For the first SD, the first UD accesses the SD1, and therefore, a value of SD1-1–UD1 is compared with a value of SD1-2–UD1. If the value of SD1-1–UD1 is greater than the value of SD1-2–UD1, the SD1-1 is selected as the management frame antenna of the first SD; and if the values are also equal, one of the antenna groups can be randomly determined as the management frame antenna of the first SD. Alternatively, a value of "SD1-1–UD1+SD2-1–UD2" may be compared with a value of "SD1-2–UD1+SD2-1–UD2". Similarly, if the value of "SD1-1–UD1+SD2-1–UD2" is greater than the value of "SD1-2–UD1+SD2-1–UD2", the SD1-1 is selected as the management frame antenna of the first SD.

For example, the first UD accesses the first SD, and the second UD accesses the second SD. Based on the foregoing embodiment, it is assumed that: SD1-1–UD1=25, SD1-1–UD2=45, SD1-2–UD1=35, SD1-2–UD2=55, SD2-1–UD1=65, SD2-1–UD2=30, SD2-2–UD1=55, and SD2-2–UD2=40. The sum of the signal quality monitored by the SD1-1 antenna group of the first SD is: SD1-1–UD1+SD1-1–UD2=25+45=70; the sum of the signal quality monitored by the SD1-2 antenna group of the first SD is: SD1-2–UD1+SD1-2–UD2=35+55=90; the sum of the signal quality monitored by the SD2-1 antenna group of the second SD is: SD2-1–UD1+SD2-1–UD2=65+30=95; and the sum of the signal quality monitored by the SD2-2 antenna group of the second SD is: SD2-2–UD1+SD2-2–UD2=55+40=95.

Further, the first signal quality accumulated value is obtained by adding up "the sum of the signal quality monitored by the SD1-1 antenna group" and "the sum of the signal quality monitored by the SD2-1 antenna group", that is, 70+95=165; the second signal quality accumulated value is obtained by adding up "the sum of the signal quality monitored by the SD1-1 antenna group" and "the sum of the signal quality monitored by the SD2-2 antenna group", that is, 70+95=165; the third signal quality accumulated value is obtained by adding up "the sum of the signal quality monitored by the SD1-2 antenna group" and "the sum of the signal quality monitored by the SD2-1 antenna group", that is, 90+95=185; and the fourth signal quality accumulated value is obtained by adding up "the sum of the signal quality monitored by the SD1-2 antenna group" and "the sum of the signal quality monitored by the SD2-2 antenna group", that is, 90+95=185.

It can be learnt that there are two maximum signal quality accumulated values, that is, the third signal quality accumulated value and the fourth signal quality accumulated value, and the corresponding antenna groups include the SD1-2, the SD2-1, and the SD2-2. For the first SD, because both the antenna group corresponding to the third signal quality accumulated value and the antenna group corresponding to the fourth signal quality accumulated value are the SD1-2, the SD1-2 can be directly determined as the management frame antenna of the first SD. For the second SD, the second UD accesses the SD1. A value of "SD2-1–UD2+SD1-2–UD1" is further compared with a value of "SD2-2–UD2+SD1-2–UD1". SD2-1–UD2+SD1-2–UD1=30+35=65, and SD2-2–UD2+SD1-2–UD1=40+35=75. It can be learnt that the value of "SD2-2–UD2+SD1-2–UD1" is greater than the value of "SD2-1–UD2+SD1-2–

UD1". Therefore, the SD2-2 is selected as the management frame antenna of the second UD.

It should be noted that after the master-slave network is just power on, no UD accesses an MD management area in an initialized state, and each SD in the MD management area first reports an antenna group identity (identity, ID or short) of each SD to the MD. The SD also needs to report an antenna type supported by the SD. For example, one identity bit in a reported message is used to identify an antenna type. If the SD supports a smart antenna, the identity bit is 1. If the SD does not support the smart antenna, the identity bit is 0.

After initialization is completed, although no UD accesses the master-slave network, the maser device may select a management frame antenna for each SD. Specifically, the master device may send a signal quality collection instruction to the first slave device and the second slave device in the management area. The signal quality collection instruction is used to instruct the first SD to separately monitor the signal quality between the first SD and the second SD by using each antenna group of the first SD, and instruct the second SD to separately monitor the signal quality between the second SD and the first SD by using each antenna group of the second SD. The signal quality collection instruction sent to the first SD may include an identity of the second SD. Similarly, the signal quality collection instruction sent to the second SD may include an identity of the first SD. Then, the first SD and the second SD separately send signal quality information to the master device.

Specifically, a process of selecting a management frame antenna by the MD is similar to the foregoing embodiment. That is, multiple signal quality accumulated values are obtained by adding up each of the sums of the signal quality monitored by all antenna groups of the first SD and each of the sums of the signal quality monitored by all antenna groups of the second SD in turn; and the master device selects the antenna group of the first SD and the antenna group of the second SD that are corresponding to the maximum signal quality accumulated value of the multiple signal quality accumulated values as the management frame antenna of the first SD and the management frame antenna of the second SD, respectively.

The foregoing embodiments are not limited thereto. Similar to the foregoing case in which a UD accesses the master-slave network, if there are multiple SDs in the MD management area, signal quality monitored by each antenna group of the first SD and signal quality monitored by each antenna group of another SD are first added up, to obtain a sum of the signal quality monitored by each antenna group of the first SD. For the second SD, similar operations are performed. Then, multiple signal quality accumulated values are obtained by adding up the sums.

It is assumed that the SD1 has two antenna groups, denoted as an SD1-1 and an SD1-2; and the SD2 also has two antenna groups, denoted as an SD2-1 and an SD2-2. An RSSI monitored by the "SD1-1" and an RSSI monitored by the "SD2-1" are added up to obtain a sum of signal quality, that is, 165; the RSSI monitored by the "SD1-1" and an RSSI monitored by the "SD2-2" are added up to obtain a sum of signal quality, that is, 165; an RSSI monitored by the "SD1-2" and the RSSI monitored by the "SD2-1" are added up to obtain a sum of signal quality, that is, 185; and the RSSI monitored by the "SD1-2" and the RSSI monitored by the "SD2-2" are added up to obtain a sum of signal quality, that is, 195. Further, for the SD1, a signal quality accumulated value is obtained by adding up the sums of the signal quality that are corresponding to the "SD1-1", that is, 165+165=330; and a signal quality accumulated value is obtained by adding up the sums of the signal quality that are corresponding to the "SD1-2", that is, 185+195=380. It can be learnt that the signal quality accumulated value corresponding to the "SD1-2" and the antenna groups of the another slave device is the maximum signal quality accumulated value. Therefore, the master device selects the "SD1-2" antenna group as the management frame antenna of the SD1. In a same way, the master device selects the "SD2-2" antenna group as the management frame antenna of the SD2.

An embodiment of the present invention further provides a master device. The master device is configured to implement functions of the method according to the foregoing embodiments in a form of hardware/software, and the hardware/software includes units that are corresponding to the functions.

Figure 4:
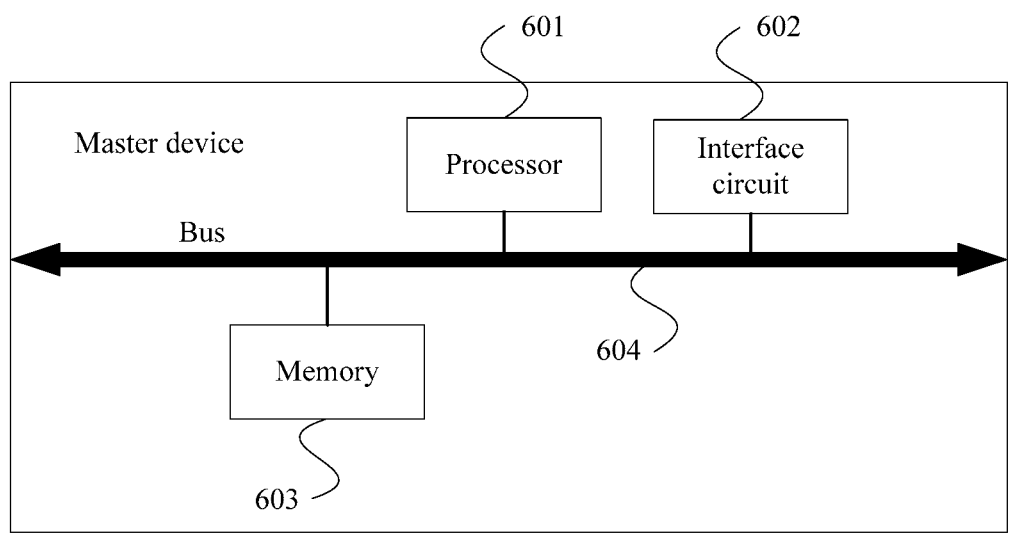
FIG. 4 is a schematic structural diagram of Embodiment 1 of a master device according to the present invention.

FIG. 4 is a schematic structural diagram of Embodiment 1 of a master device according to the present invention. The master device is applied to the master-slave network shown in FIG. 1. As shown in FIG. 4, the master device includes: a processor 601, an interface circuit 602, a memory 603, and a bus 604. The processor 601, the interface circuit 602, and the memory 603 are connected and communicate with each other by using the bus 604. The memory 603 stores a set of program code. The processor 601 invokes the program code stored in the memory 603 to execute the methods provided in the foregoing embodiments. The implementation principles and technical effects are similar to those of the methods and are not repeated herein.

The master device is configured to execute the foregoing method embodiments. The implementation principles and technical effects are similar to those of the method embodiments and are not repeated herein.

Further, an embodiment of the present invention further provides a computer storage medium, configured to store computer software instructions to be used by the foregoing master device, where the computer software instruction includes a program used to execute the foregoing method embodiments.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for selecting a management frame antenna based on a master-slave network, wherein the master-slave network comprises: a master device, a first slave device, a second slave device, and a first user device, wherein the first user device is connected to the first slave device, and wherein the method comprises:

determining, by the master device, whether to send a signal quality collection instruction to the first slave device and the second slave device, wherein a determination to send the signal quality collection instruction is made when the master device detects that at least one of:
  a second user device newly accesses the master-slave network; or
  signal quality between the first user device and the first slave device meets a preset condition;
in response to determining that the signal quality collection instruction is to be sent, sending, by the master device, the signal quality collection instruction to the first slave device and the second slave device, wherein the signal quality collection instruction includes identity of the first user device and the identity of the second user device, and wherein:
  the signal quality collection instruction instructs the first slave device to separately monitor signal quality between the first slave device and the first user device and signal quality between the first slave device and the second user device using each antenna group of the first slave device; and
  the signal quality collection instruction instructs the second slave device to separately monitor signal quality between the second slave device and the first user device and signal quality between the second slave device and the second user device using each antenna group of the second slave device;
receiving, by the master device, signal quality information returned by the first slave device and signal quality information returned by the second slave device; and
selecting, by the master device according to the received signal quality information, an antenna group as a management frame antenna for the first slave device and an antenna group as a management frame antenna for the second slave device.

2. The method according to claim 1, wherein the selecting, by the master device according to the received signal quality information, an antenna group for the first slave device and an antenna group for the second slave device comprises:
  adding up signal quality between the first slave device and the first user device and signal quality between the first slave device and the second user device that are monitored by a same antenna group of the first slave device to obtain a sum of the signal quality monitored by the antenna group of the first slave device;
  adding up signal quality between the second slave device and the first user device and signal quality between the second slave device and the second user device that are monitored by a same antenna group of the second slave device to obtain a sum of the signal quality monitored by the antenna group of the second slave device;
  obtaining multiple signal quality accumulated values by separately adding up each of sums of the signal quality monitored by all antenna groups of the first slave device and each of sums of the signal quality monitored by all antenna groups of the second slave device; and
  determining an antenna group of the first slave device and an antenna group of the second slave device corresponding to a maximum signal quality accumulated value of the multiple signal quality accumulated values as the management frame antenna of the first slave device and the management frame antenna of the second slave device, respectively.

3. The method according to claim 2, wherein the determining an antenna group of the first slave device and an antenna group of the second slave device corresponding to a maximum signal quality accumulated value of the multiple signal quality accumulated values as the management frame antenna of the first slave device and the management frame antenna of the second slave device, respectively, comprises:
  if there are multiple maximum signal quality accumulated values:
    determining antenna groups of the first slave device and antenna groups of the second slave device corresponding to the maximum signal quality accumulated values of the multiple signal quality accumulated values; and
    selecting, from the determined antenna groups of the first slave device and the determined antenna groups of the second slave device, antenna groups corresponding to a maximum signal quality accumulated value among antenna groups connected to the first user device or the second user device as the management frame antenna of the first slave device and the management frame antenna of the second slave device.

4. The method according to claim 3, wherein the signal quality information comprises one or a combination of the following: a signal strength, a signal-to-noise ratio, and a distance between an antenna group and a monitored user device.

5. The method according to claim 2, wherein the signal quality information comprises one or a combination of the following: a signal strength, a signal-to-noise ratio, and a distance between an antenna group and a monitored user device.

6. The method according to claim 1, wherein the signal quality information comprises one or a combination of the following: a signal strength, a signal-to-noise ratio, and a distance between an antenna group and a monitored user device.

7. The method according to claim 1, wherein the receiving, by the master device, signal quality information returned by a first slave device and signal quality information returned by a second slave device comprises:
  each of the signal quality information returned by the first slave device is corresponding to each antenna group that monitoring the first user device and the second user device respectively, wherein the first slave device includes two or more antenna groups; and
  each of the signal quality information returned by the second slave device is corresponding to each antenna group that monitoring the first user device and the second user device respectively, wherein the second slave device includes two or more antenna groups.

8. A master device, wherein the master device is applied to a master-slave network, the master-slave network comprises: the master device, a first slave device, a second slave device, and a first user device, wherein the first user device is connected to the first slave device, and wherein the master device comprises a computer-readable storage medium storing instructions, when executed, cause at least one processor to perform the following operations:
  determine whether to send a signal quality collection instruction to the first slave device and the second slave device comprises, wherein a determination to send the signal quality collection instruction is made when the master device detects that at least one of:
    a second user device newly accesses the master-slave network; or
    signal quality between the first user device and the first slave device meets a preset condition;

in response to determining that the signal quality collection instruction is to be sent, sends the signal quality collection instruction to the first slave device and the second slave device, wherein the signal quality collection instruction includes identity of the first user device and the identity of the second user device, and wherein:

the signal quality collection instruction instructs the first slave device to separately monitor signal quality between the first slave device and the first user device and signal quality between the first slave device and the second user device using each antenna group of the first slave device; and the signal quality collection instruction instructs the second slave device to separately monitor signal quality between the second slave device and the first user device and signal quality between the second slave device and the second user device using each antenna group of the second slave device;

receive signal quality information returned by the first slave device and signal quality information returned by the second slave device; and select, according to the received signal quality information, an antenna group as a management frame antenna for the first slave device and an antenna group as a management frame antenna for the second slave device.

9. The master device according to claim 8, wherein the instructions, when executed, cause at least one processor to perform the following operations:

add up signal quality between the first slave device and the first user device and signal quality between the first slave device and the second user device that are monitored by a same antenna group of the first slave device to obtain a sum of the signal quality monitored by the antenna group of the first slave device;

add up signal quality between the second slave device and the first user device and signal quality between the second slave device and the second user device that are monitored by a same antenna group of the second slave device, to obtain a sum of the signal quality monitored by the antenna group of the second slave device;

obtain multiple signal quality accumulated values by separately adding up each of sums of the signal quality monitored by all antenna groups of the first slave device and each of sums of the signal quality monitored by all antenna groups of the second slave device; and determine an antenna group of the first slave device and an antenna group of the second slave device corresponding to a maximum signal quality accumulated value of the multiple signal quality accumulated values as the management frame antenna of the first slave device and the management frame antenna of the second slave device, respectively.

10. The master device according to claim 9, wherein the determining an antenna group of the first slave device and an antenna group of the second slave device corresponding to a maximum signal quality accumulated value of the multiple signal quality accumulated values as the management frame antenna of the first slave device and the management frame antenna of the second slave device, respectively, comprises:

when there are multiple maximum signal quality accumulated values:

determine antenna groups of the first slave device and antenna groups of the second slave device corresponding to the maximum signal quality accumulated values of the multiple signal quality accumulated values; and select, from the determined antenna groups of the first slave device and the determined antenna groups of the second slave device, antenna groups corresponding to a maximum signal quality accumulated value among antenna groups connected to the first user device or the second user device as the management frame antenna of the first slave device and the management frame antenna of the second slave device.

11. The master device according to claim 10, wherein the signal quality information comprises one or a combination of the following: a signal strength, a signal-to-noise ratio, and a distance between an antenna group and a monitored user device.

12. The master device according to claim 9, wherein the signal quality information comprises one or a combination of the following: a signal strength, a signal-to-noise ratio, and a distance between an antenna group and a monitored user device.

13. The master device according to claim 8, wherein the signal quality information comprises one or a combination of the following: a signal strength, a signal-to-noise ratio, and a distance between an antenna group and a monitored user device.

14. A master device, wherein the master device is applied to a master-slave network, the master-slave network comprises: the master device, a first slave device, a second slave device, and a first user device, wherein the first user device is connected to the first slave device, wherein the master device comprises: at least one processor, an interface circuit, a memory, and a bus, wherein the at least one processor, the interface circuit, and the memory are connected and communicate with each other using the bus, the memory stores a set of program code, and the at least one processor invokes the program code stored in the memory to perform the following operations:

when signal quality between the first user device and the first slave device meets a preset condition, sending, using the interface circuit, a signal quality collection instruction to the first slave device and the second slave device, wherein the signal quality collection instruction includes identity of the first user device and the identity of the second user device, and wherein:

the signal quality collection instruction instructs the first slave device to separately monitor signal quality between the first slave device and the first user device and signal quality between the first slave device and the second user device using each antenna group of the first slave device; and the signal quality collection instruction instructs the second slave device to separately monitor signal quality between the second slave device and the first user device and signal quality between the second slave device and the second user device using each antenna group of the second slave device;

receiving, using the interface circuit, signal quality information returned by the first slave device and signal quality information returned by the second slave device; and selecting, according to the received signal quality information, an antenna group as a management frame antenna for the first slave device and an antenna group as a management frame antenna for the second slave device.

15. The master device according to claim 14, wherein the selecting, by the at least one processor according to the received signal quality information, an antenna group as a management frame antenna for the first slave device and an antenna group as a management frame antenna for the second slave device comprises:

adding up signal quality between the first slave device and the first user device and signal quality between the first slave device and the second user device monitored by a same antenna group of the first slave device to obtain a sum of the signal quality monitored by the antenna group of the first slave device;

adding up signal quality between the second slave device and the first user device and signal quality between the second slave device and the second user device monitored by a same antenna group of the second slave device to obtain a sum of the signal quality monitored by the antenna group of the second slave device;

obtaining multiple signal quality accumulated values by separately adding up each of sums of the signal quality monitored by all antenna groups of the first slave device and each of sums of the signal quality monitored by all antenna groups of the second slave device; and determining an antenna group of the first slave device and an antenna group of the second slave device corresponding to a maximum signal quality accumulated value of the multiple signal quality accumulated values as the management frame antenna of the first slave device and the management frame antenna of the second slave device, respectively.

16. The master device according to claim 15, wherein the determining, by the at least one processor, an antenna group of the first slave device and an antenna group of the second slave device corresponding to a maximum signal quality accumulated value of the multiple signal quality accumulated values as the management frame antenna of the first slave device and the management frame antenna of the second slave device, respectively, comprises:

if there are multiple maximum signal quality accumulated values:

determining antenna groups of the first slave device and antenna groups of the second slave device corresponding to the maximum signal quality accumulated values of the multiple signal quality accumulated values; and selecting, from the determined antenna groups of the first slave device and the determined antenna groups of the second slave device, antenna groups corresponding to a maximum signal quality accumulated value among antenna groups connected to the first user device or the second user device as the management frame antenna of the first slave device and the management frame antenna of the second slave device.

17. The master device according to claim 16, wherein the signal quality information comprises one or a combination of the following: a signal strength, a signal-to-noise ratio, and a distance between an antenna group and a monitored user device.

18. The master device according to claim 15, wherein the signal quality information comprises one or a combination of the following: a signal strength, a signal-to-noise ratio, and a distance between an antenna group and a monitored user device.

19. The master device according to claim 14, wherein the signal quality information comprises one or a combination of the following: a signal strength, a signal-to-noise ratio, and a distance between an antenna group and a monitored user device.

\* \* \* \* \*